United States Patent [19]

Younkin

[11] 4,008,618
[45] Feb. 22, 1977

[54] FLIGHT INSTRUMENT
[75] Inventor: James R. Younkin, Fayetteville, Ark.
[73] Assignee: Edo-Aire Mitchell Industries, Inc., Mineral Wells, Tex.
[22] Filed: Aug. 4, 1975
[21] Appl. No.: 601,823

Related U.S. Application Data

[62] Division of Ser. No. 454,305, March 25, 1974, Pat. No. 3,940,990.
[52] U.S. Cl. .................................................. 73/387
[51] Int. Cl.$^2$ .......................................... G01L 7/14
[58] Field of Search ............ 73/384, 386, 387, 393, 73/178 T; 244/77 D; 235/150.2, 150.22; 340/27 NA; 343/5 DP, 12 A; 116/DIG. 43

[56] References Cited
UNITED STATES PATENTS

| | | | |
|---|---|---|---|
| 3,154,948 | 11/1964 | Andresen, Jr. | 73/386 |
| 3,625,060 | 12/1971 | McCallion et al. | 73/386 |
| 3,821,698 | 6/1974 | Tippetts | 340/27 NA |
| 3,890,614 | 6/1975 | Argentieri | 73/384 |

*Primary Examiner*—Donald O. Woodiel
*Attorney, Agent, or Firm*—Richards, Harris & Medlock

[57] ABSTRACT

Aircraft altitude is visually displayed at a front panel of a flight instrument in analog form by a rotating pointer and in digital form by means of a rotary drum digital indicator. Barometric pressure is converted into rectilinear motion to drive a mechanical-to-electrical transducer providing a signal to a servo amplifier having an output coupled to a servomotor. The servomotor drives both the rotating pointer and the rotary drum digital indicator. Also coupled to the mechanical-to-electrical transducer is a manually adjustable set input signal to correct for atmospheric pressure along a given flight path with respect to sea level. Temperature and altitude error corrections are also coupled to the transducer to correct the servomotor drive signal to give a true indicated altitude display. Also driven by the servomotor is a pressure altitude encoder for providing absolute altitude digital signals for transmission to a ground station. As a further extension, the servomotor drives a velocity generator that functions integrally with an altitude selector to provide vertical velocity control signals to the aircraft autopilot system.

14 Claims, 12 Drawing Figures

FLIGHT INSTRUMENT

This is a division of application Ser. No. 454,305, filed Mar. 25, 1974 now U.S. Pat. No. 3,940,990.

This invention relates to a flight instrument and more particularly to a flight instrument for displaying aircraft altitude.

Heretofore, flight instruments for indicating the altitude of an aircraft in flight employed synchronized rotating pointers for displaying an analog indication of the altitude of an aircraft. As with any analog type pointer instrument, some interpretation of needle position is required by the operator. Under adverse conditions, or in an emergency situation, when the aircraft altitude must be quickly and accurately determined, the interpretation of needle position may unfortunately result in an error with resulting undesirable consequences. Even under normal flying conditions, an aircraft operator has numerous duties to perform in piloting an aircraft and the setting of selected altitude adjustments must be completed rapidly and accurately.

Another problem often encountered with present day altitude indicator systems is that compensation for barometric correction is accomplished by mechanical means. These mechanical devices usually comprise bell cranks and other linkages and the correction is accurate only at one of two points over the linkage travel. Mechanically driven altitude indicators also present significant errors in reading due to a lack of accurate temperature and altitude correction. Again, the temperature and altitude error correction devices are usually accurate at only one or two points of the indicated display.

A feature of the present invention is to provide a flight instrument with an altitude indicator having both an analog and digital display. The analog display indicates continuous changes of altitude while the digital display indicates altitude readings in fixed increments. Another feature of the invention is to provide a flight instrument with an altitude indicator corrected for atmospheric pressure at a given elevation. Still another feature of the present invention is to provide an aircraft instrument having a barometric pressure responsive transducer for generating barometric change signals, and wherein the barometric level set point correction is adjusted by a control knob coupled to a barometric pressure set point digital readout at the meter front. Yet another feature of the present invention is to provide a flight instrument having a digital altitude indicator corrected for temperature and altitude errors.

In accordance with the present invention, a flight instrument for an aircraft includes an altitude indicator having a digital display and an analog display each driven by a servomotor in accordance with an altitude signal corrected for atmospheric pressure. The flight instrument further includes at the meter front an altitude selector adjustment coupled to a generator having a signal output of a selected altitude. A digital indicator is coupled to the altitude selector adjustment for displaying the selected altitude.

Also in accordance with this invention, the above flight instrument further includes a transducer responsive to changes in atmospheric pressure for converting pressure change into an aircraft altitude signal. This atmospheric pressure responsive transducer is coupled to a set point adjustment for establishing a particular barometric level about which changes are reflected in the output of the transducer. The transducer further receives temperature and altitude error correction signals from corrector networks.

A more complete understanding of the invention and its advantages will be apparent from the specification and claims and from the accompanying drawings illustrative of the invention.

Referring to the drawings.

Referring to the figures, the aircraft altimeter flight instrument includes a supporting frame 10 having a front plate 12 etched or otherwise marked with increments of altitude on a scale 14, typically in increments of 100 feet between major index points. Covering the front plate is a transparent display window 16 for viewing the various displays related to aircraft altitude.

Displayed on the front plate 12 by means of a pointer 18 is an analog representation of aircraft altitude that also provides to a pilot a visual altitude rate of change. Cooperating with the pointer 18, also to indicate aircraft altitude, is a digital display 20 giving a numerical indication of altitude in increments of 10 feet at the right hand digit. The use of an analog pointer 18 for indicating continuous changes of aircraft altitude along with the digital display 20 simplifies for a pilot the control of aircraft altitude.

At the base of the front plate 12 there is displayed by a digital rotary drum indicator 24 a desired selected altitude to be maintained on a given portion of a flight. The selected altitude digital rotary drum indicator 24 is coupled through appropriate gear trains, to be described, to adjusting knobs 26 and 28 at the lower right hand corner of the instrument front. Adjustment knob 26 couples directly to the second and third place digits of the indicator 24 while the adjustment knob 28 couples to the farthermost digit to the right, through a gear train and flexible drive. With the dual knob arrangement, the coarse adjustment of a selected altitude is made by operation of the adjustment knob 26 and the fine adjustment for a selected altitude is made by operation of the adjusting knob 28.

One additional display appears at the front plate 12; this is the digital readout utilizing a digital rotary drum indicator 30. The indicator 30 is a visual display of a selected barometric pressure set point in inches of mercury or as alternative in millibars. A pilot sets the barometric level set point at the value for the local area over which he is flying. This setting is made by the pilot by means of an adjusting knob 32 coupled by a gear train, to be described, to the digital indicator 30.

Referring specifically to FIGS. 3 through 6, the analog altitude indication as given by the pointer 18 is rotatably mounted on a shaft 34 through the center of the digital indicator 20. A spur gear 36 at the inboard end of the shaft 34 drives the pointer 18 through a power train that includes a spur gear 38 mounted to a shaft 40 also supporting a drive gear 42 at the opposite end thereof and the wiper arm of a potentiometer 116. The drive gear 42 is in engagement with a spur gear 44 mounted on a shaft 46 with a drive gear 48. The drive gear 48 engages an output spur gear 50 of a servomotor 52 coupled to an altitude control system, to be described with reference to FIG. 10.

Also coupled to the shaft 46 at the front plate end of the instrument is a bevel gear 56 in engagement with a bevel gear 58. The bevel gear 58 is mounted on a shaft 60 carrying four rotary drum type digital indicator 62–65. These rotary drum digital indicators are of a conventional design such that each subsequent drum rotates one position for each complete turn of the previous drum. Drums 63, 64 and 65 display aircraft altitude in increments of one hundred, one thousand, and ten thousand feet, respectively. Drum 62 is essentially an analog readout of an aircraft altitude, and indicates less that 100 foot increments of the drum 63. As such, each of the display drums 62–65, beginning at drum 62, displays the next larger increment of altitude than the preceding drum; the drum 62 rotates continuously with the indicator 18 that also displays altitude in less than 100 foot increments.

Energization of the altitude servomotor 52 by a signal from a control system causes the pointer 18 and the display 20 to indicate aircraft altitude. The analog pointer 18 indicates aircraft altitude and a complete revolution thereof typically requires 1,000 feet of altitude change. One turn of the pointer 18 around the scale 14 is provided by appropriate gear ratios between the gears 36 and 38, the gears 42 and 44 and the gears 48 and 50.

The counter drive shaft 60, through the one-to-one gear ratio of the bevel gears 56 and 58 and the ratio of the gears 48 and 50, rotates once for each 100 feet of altitude change. Thus, for each 100 feet of altitude change the display drum 62 completes one revolution. Each revolution of the drum 62 advances the drum 63 one position in accordance with conventional rotary drum display indicators. For a pilot to determine his aircraft altitude from a digital display 20, he observes the digits appearing on the drums 62, 63, 64 and 65. The result gives aircraft altitude to the nearest 10 feet. This is a considerably simplified technique over altitude indicators employing concentrically mounted pointers for indicating altitude. By mounting the pointer shaft 34 through the digital display 20, a further improvement in readability is achieved. A pilot quickly associates the digital altitude indication at the indicator display 20 with the pointer 18. The digital readouts to the left of the pointer shaft 34 indicate altitude increments higher than those indicated by the pointer 18. The pointer 18 and the drums to the right of pointer shaft 34 are presenting the same information; i.e., increments of 1000 feet or less.

In addition to the gear train from the servomotor 52 to the analog and digital altitude indicators, a gear train is also provided from the servomotor to an altitude responsive pressure transducer 66. The pressure transducer 66 may be of aneroid type having a capacitance pick-off described in a copending application of James R. Younkin, filed Mar. 25, 1974, Ser. No. 454,365, now U.S. Pat. No. 3,929,019.

The servomotor 52 is coupled to the feedback positioning shaft 68 of the transducer 66 through a drive gear 70. The drive gear 70 engages a spur gear (not shown) rotating with the drive gear 42 on the shaft 40. Basically, in operation of the barometric pressure transducer 66, a change in altitude is signified by the output signal from a pick-off. This output signal is coupled to a control system which generates the energizing voltages for the servomotor 52. Rotation of the feedback shaft 68, by means of the gear train including gears 70, 42, 44, 48 and 50, repositions the pick-off of the transducer 66 to return the output signal therefrom to zero.

Also driven by the servomotor 52 is an altitude potentiometer 72 having an output shaft supporting a spur gear 74. The spur gear 74 engages a spur gear rotating with the drive gear 42 on the shaft 40. In a manner to be described, the potentiometer 72 is coupled to an altitude control system for controlling the operation of the servomotor 52.

Figures 3, 7, 9:
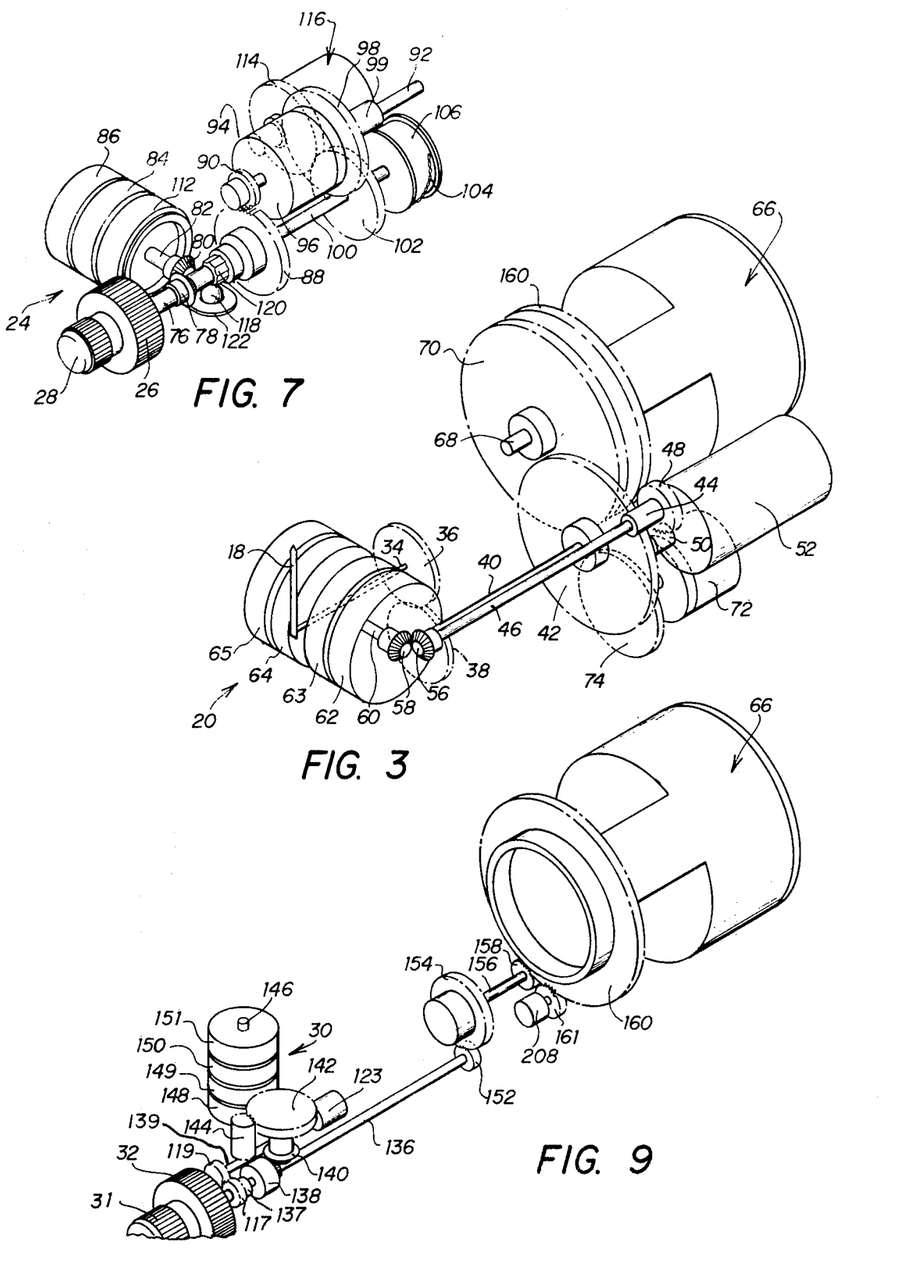
FIG. 3 is a pictorial view of the power train for driving the analog and digital altitude displays.
FIG. 7 is a pictorial view of the altitude select drive train and the digital altitude select indicator.
FIG. 9 is a pictorial view of the drive train for the barometric level set point for the barometric pressure responsive transducer and the digital display coupled to the set point adjustment.
Figure 4:
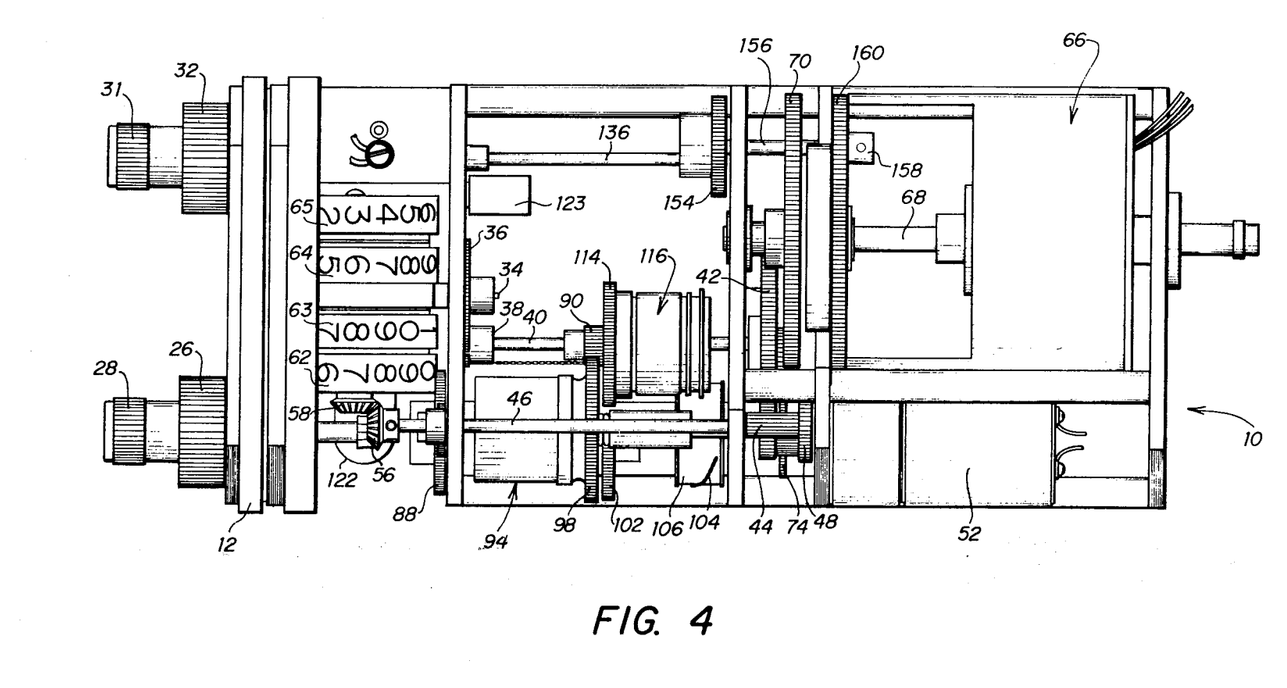
FIG. 4 is a top view of the flight instrument of FIG. 1.
Figure 5:
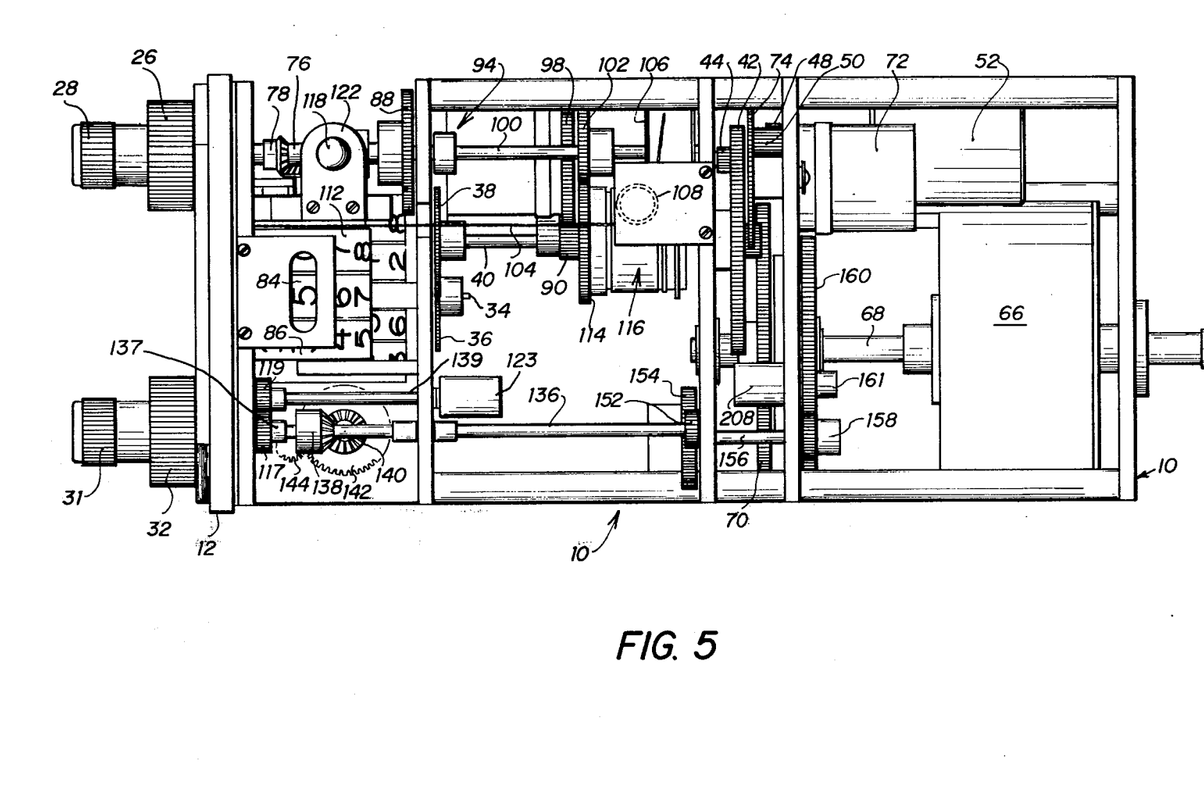
FIG. 5 is a bottom view of the flight instrument of FIG. 1.
Figure 6:
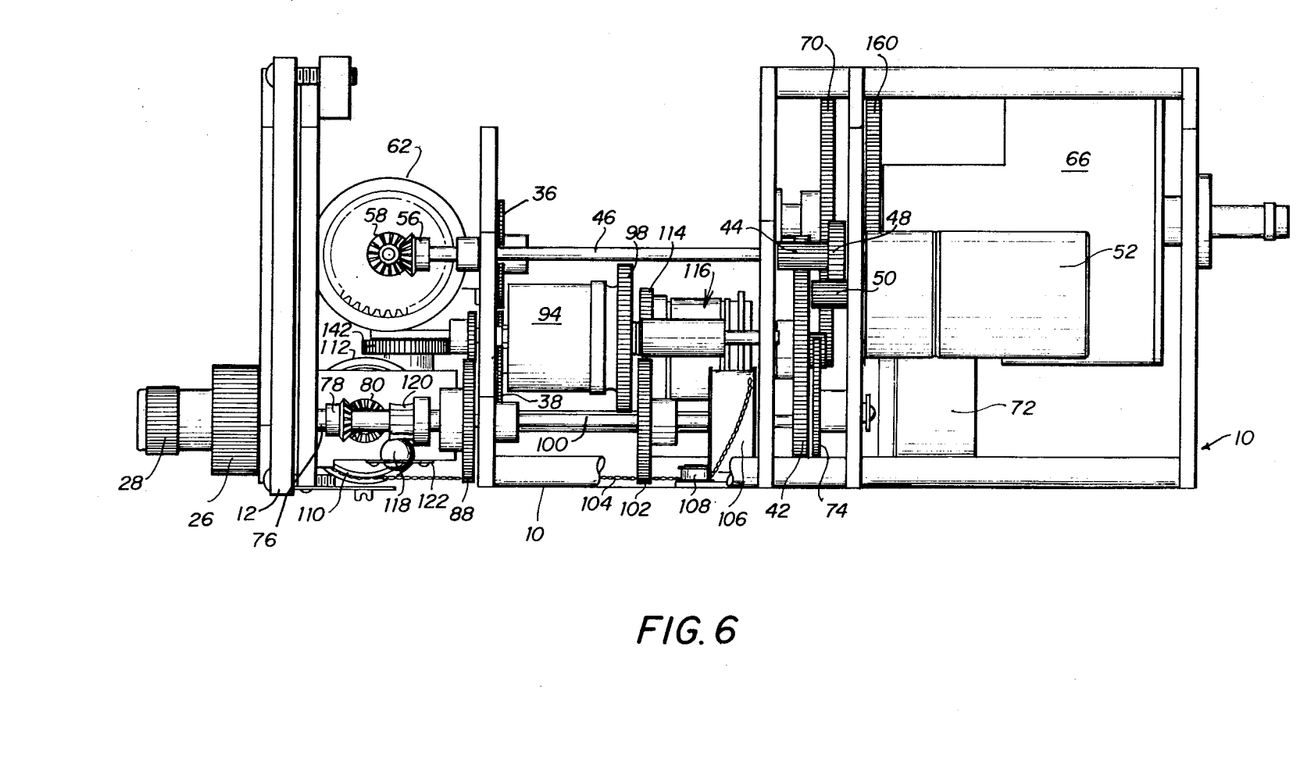
FIG. 6 is a right hand side view of the flight instrument of FIG. 1.
Figure 8:
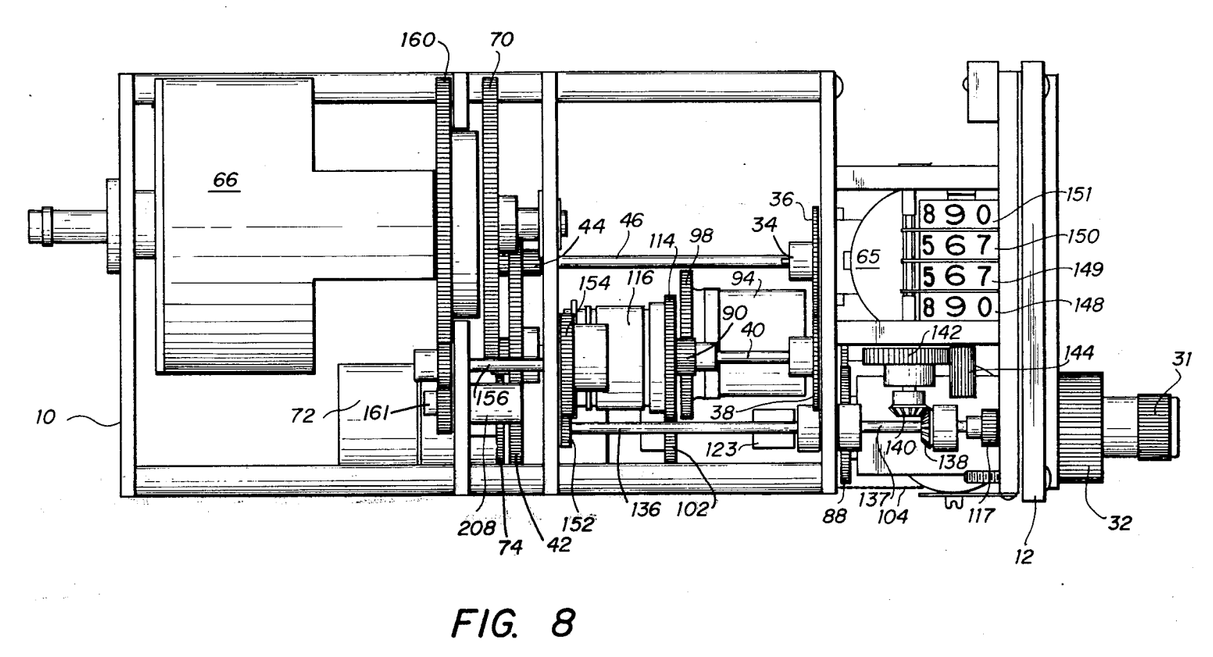
FIG. 8 is a left hand view of the flight instrument of FIG. 1 showing the atmospheric pressure responsive transducer and the set point adjustment therefor.

With emphasis now on FIGS. 5, 6 and 7, a pilot may select a desired altitude by positioning the adjustment knobs 26 and 28. As explained previously, the adjustment knob 26 establishes the coarse altitude selected (e.g., 1,000 foot increments) and the knob 28 generates a fine altitude selection (e.g., 100 foot increments) signal. Referring first to the coarse adjustment mechanism, the adjustment knob 26 is mounted to a drive shaft 76 having a bevel gear 78 attached thereto. The bevel gear 78 engages a bevel gear 80 mounted on a shaft 82. Coupled to the shaft 82 is a rotary drum indicator 84 that rotates once for each rotation of the adjustment knob 26. Each complete rotation of the drum indicator 84 reflects a 10,000 foot increment in altitude selection. Each 36° (1/10 of a revolution) movement of the knob 26 gives an incremental change of 1000 feet in selected altitude, as shown by the drum 84 advancing one increment. Conventionally arranged with the drum indicator 84 is a rotary drum indicator 86 for indicating by a complete revolution thereof 100,000 feet of altitude selection. Thus, by adjusting the knob 26 a pilot, by means of the digital drum indicators 84 and 86, has presented to him a digital indication of a selected altitude in 1,000 foot increments by means of the indicators 84 and 86.

To convert a movement of the knob 26 into a coarse adjustment altitude selector signal, the shaft 76 carries a drive gear 88 that engages a spur gear 90 on a potentiometer shaft 92. The potentiometer shaft 92 carries the wiper arm of a potentiometer 94 having a housing 96 containing a potentiometer element. The housing 96 of the potentiometer 94 is held in place by the engagement of a gear 98 as part of the fine adjustment drive train.

With the arrangement shown, a movement of the adjusting knob 26 positions the wiper arm of the potentiometer 94 with respect to the potentiometer element by means of the gears 88 and 90. This causes a coarse altitude selector signal to be generated to an autopilot. The autopilot may provide the conventional aircraft control signals to the control surfaces of an aircraft for appropriate aircraft maneuvering.

To positively position the coarse adjustment power train, a ball detent 118 engages an indexing wheel 120 mounted to the shaft 76. Each indexing position of the wheel 120 represents one digit on the digital display indicator 84. The ball detent 118 is maintained in engagement with the indexing wheel 120 by means of a positioning spring 122.

For a fine (less than 1,000 foot change) altitude selection, the shaft 76 is mounted concentric with a shaft 100, with the latter having attached thereto the adjustment knob 28. At the inboard end of the shaft 100 there is mounted a gear 102 and a drum 106. Attached to the surface of the drum 106 is a flexible belt 104 that is guided around an idler pulley 108 to an indicator pulley 110. The pulley 110 is affixed to rotate with a rotary drum indicator 112 as part of the display 24. The drum 112 freely rotates on the shaft 82 and displays the least significant increment of altitude selection to a pilot. Although arranged on a common shaft 82 with the digital drum indicators 84 and 86, the drum indicator 112 operates independently of the two higher increment displays. A complete revolution of the drum indicator 112 equals 1,000 feet of selected altitude.

To generate the fine adjustment altitude select signal (i.e., increments of 100 feet) the adjustment knob 28 is rotated to drive the gear 102 through the shaft 100. In engagement with the gear 102 is a gear 114 that is rigidly attached to the housing of a potentiometer 116 as part of the fine adjustment altitude select loop. Integral with the gear 114 is a spur gear 99 both freely rotating on the shaft 40. The spur gear 99 is in engagement with a gear 98 that is rigidly attached to the housing of the potentiometer 94.

Secured to the shaft 40 is the wiper arm of the potentiometer 116; the shaft 40 is shown in FIG. 3 to be part of the drive train for the analog pointer 18. Thus, an electrical output of the potentiometer 116 is directly related to the position of the analog pointer 18 and the adjustment of the knob 28.

In operation of the altitude fine adjustment altitude select loop, rotation of the adjustment knob 28 produces a relative movement between the wiper arm and element of the potentiometer 94 through the gear train including gears 102, 114, 99 and 98. Rotation of the knob 28 also causes relative movement between the wiper arm and potentiometer element of the potentiometer 116 in the fine select loop. By proper selection of the gears 99 and 98, a movement of the knob 28 causes the wiper arm of the potentiometer 94 to move relative to the housing 96 by an amount equal to the movement of the housing of the potentiometer 116 relative to the wiper arm. That is, equal in electrical result. For one complete turn of the shaft 100, which represents a 1,000 foot change, the wiper arm of the potentiometer 94 moves relative to the housing 96 by 90°, assuming that the potentiometer 94 has a ten turn configuration such 90° represents one-fourth of the total travel of the wiper arm relative to the housing 96. By this arrangement, an altitude select signal is continuous even though the ball detent 118 and the indexing wheel 120 provide fixed increment steps of altitude change through the adjustment knob 26. That is, the altitude adjust signal not only changes in digitized amounts by means of the detent 118, but also there is continuous movement between the 1,000 foot fixed values controlled by the detent 118 as provided by the adjustment knob 28 and relative movement between the potentiometers 94 and 116.

Figure 1:
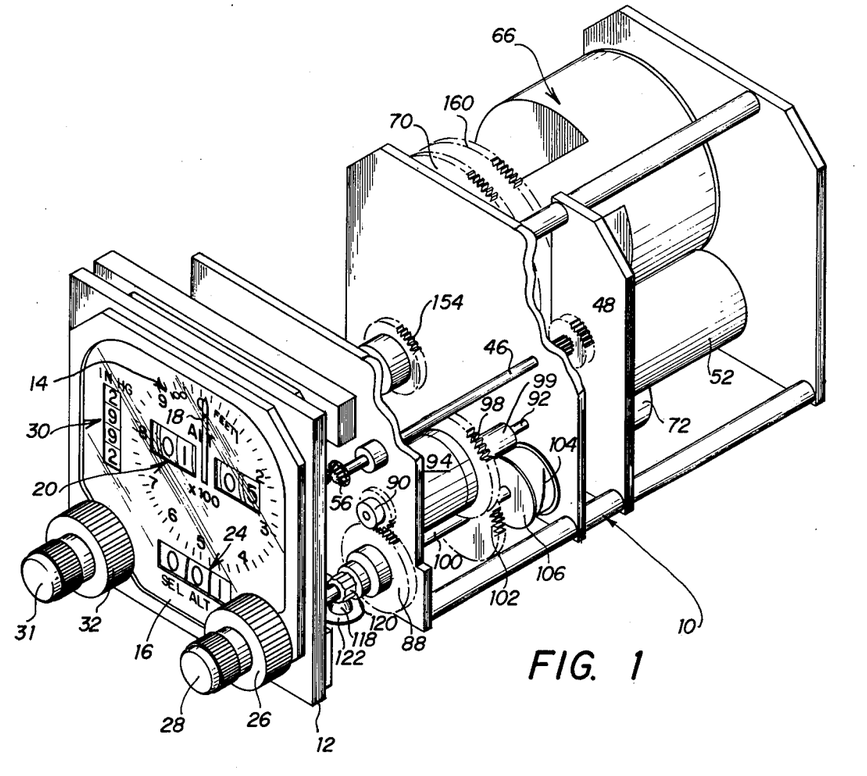
FIG. 1 is a pictorial view of an altimeter flight instrument having digital readout altitude information.
Figure 2:
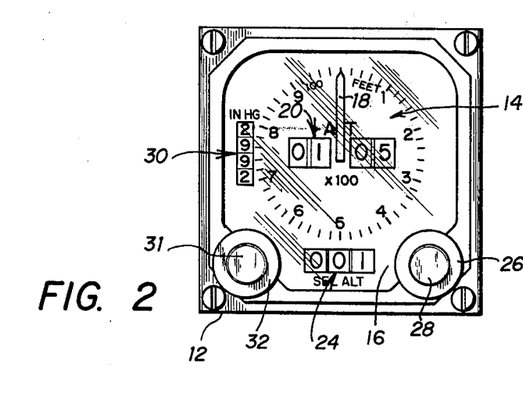
FIG. 2 is a front view of the altimeter flight instrument of FIG. 1 showing an analog and digital altitude indicator, a digital altitude select indicator and a digital barometric level set point indicator.

As an aircraft covers a given course the barometric pressure at ground level changes due to local atmospheric conditions. To reference the barometric pressure responsive transducer 66 to a particular ground barometric level set point, the adjusting knob 31 couples to a drive shaft 136 extending through the front plate 12 and tword the rear of the frame 10. At the forward end of the drive shaft 136 there is mounted a bevel gear 138 that engages a bevel gear 140 mounted on a vertical shaft. Also mounted on this vertical shaft is a drive gear 142 that engages a spur gear 144 coupled to an indicator shaft 146. Mounted on the indicator shaft 146 are four digital rotary drum indicators 148–151 with the first drum 148 coupled to rotate with the spur gear 144. Each of the remaining drum indicators 149–151 rotates in the conventional manner through a coupling to the preceding drum indicator. Displayed on the drum indicators 148–151 is a barometric level set point as given by the display 30 of FIG. 2. This readout display is in inches of mercury or millibars. Concentrically mounted to rotate about the shaft 136 there is a shaft 137 having attached thereto a spur gear 117 that engages with a spur gear 119 on a shaft 139 driving the wiper arm of the potentiometer 123. The shaft 137 extends through the front plate 12 and is rotated by means of the knob 32. Potentiometer 123 is connected to other circuits which allow the position of the wiper of potentiometer 123 to limit the vertical rate of displacement of an aircraft in either a climbing or descending attitude when coupled to an autopilot.

Also coupled to the drive shaft 136 is a spur gear 152 engaging a drive gear 154 mounted on a shaft 156. A spur gear 158 is also mounted to the shaft 156 and engages a drive gear 160 coupled to the housing of the altitude responsive pressure transducer 66. The housing is rotatably mounted on the shaft 68 and is positioned by means of the adjustment knob 31. The indicated altitude set point of the pressure transducer 66 may be adjusted by rotating the transducer housing. This establishes a predetermined relationship between a pick-off and an aneroid (schematically shown in FIG. 11) of the transducer 66. Also rotating with the housing of the transducer 66 is a spur gear 161 coupled to the wiper arm of the potentiometer 208 as part of a compensation circuit for the transducer 66, also to be explained.

Adjustment of the knob 31 positions the housing of the transducer 66 through the drive shaft 136 and the gear train including gears 152, 154, and 158 engaging the drive gear 160. This establishes a set point output signal from the transducer 66. Any variation of an aircraft in altitude with reference to this barometric set point causes a change in the output signal from the transducer pick-off. This, as explained previously, causes an energization of the altitude servomotor 52 and a repositioning of the transducer pick-off through the gears 42 and 70. Repositioning the transducer pick-off returns the output signal thereof to a desired level and the system is at rest.

Figure 10:
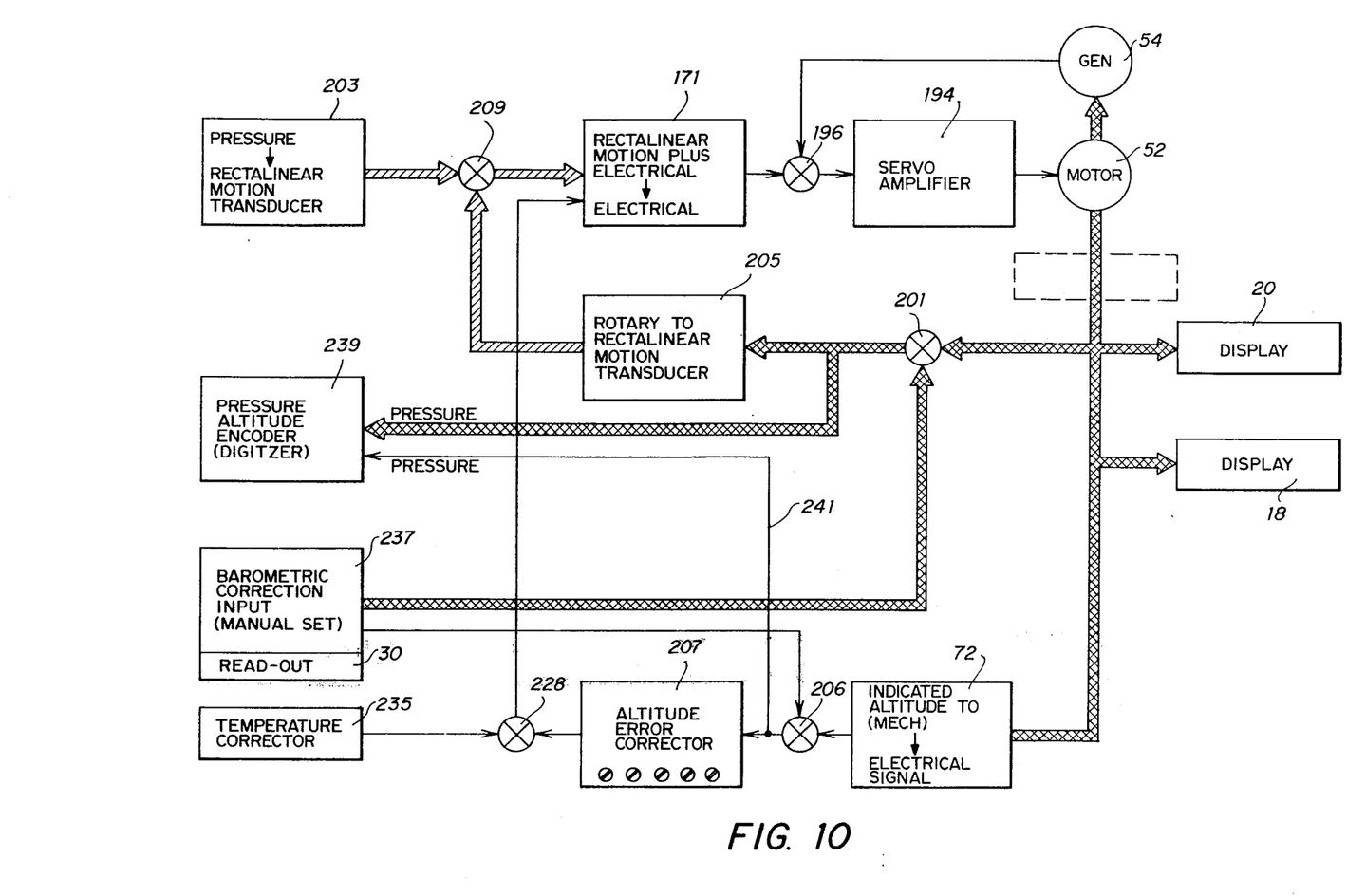
FIG. 10 is a block diagram of the altitude indicator system of FIGS. 1-9.

Referring to FIG. 10, there is shown a block diagram of the altimeter flight instrument of FIGS. 1-9. The source of information for controlling the analog readout 18 and the digital readout 20 is the pressure responsive transducer 66 as represented by blocks 171, 203 and 205 and the summing junction 209. A pressure transducer 203 translates atmospheric pressure into a rectilinear motion to the summing junction 209. Preferably, the pressure transducer is an aneroid as described in the copending application, filed Mar. 25, 1974 Ser. No. 454,365, now U.S. Pat. No. 3,953,847 although other devices may be utilized, such as a spring biased bellows or any device that will convert atmospheric pressure as a function of altitude into rectilinear motion. The output of the pressure transducer 203, a rectilinear motion signal, is applied to the summing junction 209 and an error signal is subsequently applied to a rectilinear motion plus electrical signal converter 171 that provides an electrical output signal to a summing junction 196.

As an explanation of the symbols used in FIG. 10, the double walled arrows with single cross hatching represent rectilinear motion and this motion is an input or the output of the summing junction 209. Double walled arrows with double crossed hatching represent rotary mechanical motion as produced by the servomotor 52. Single line arrows of FIG. 10 represent electrical signal channels.

An electrical error signal output from a summing junction 196 is applied to the input of a servo amplifier 194 having an output for driving the servomotor 52. Coupled to the output shaft of the servomotor 52 is a velocity signal generator 54 providing an electrical feedback signal to the summing junction 196. An output signal from the generator 54 as fed back to the servo amplifier 194 serves to dampen the dynamics of the servo loop. Its prime function is to stabilize the system. In addition, however, the output of the generator 54 provides a vertical speed signal to the aircraft autopilot.

In addition to driving the generator 54, the servomotor 52 also drives the analog display 18 and the digital display 20 through a gear train including the shafts 40 and 46 as detailed in FIG. 3. Thus, the output of the servomotor 52 through the gear train of FIG. 3 provides to a pilot indicated altitude in both analog and digital format. The servomotor 52 thus provides all system torque required to display indicated altitude in both analog and digital formats. That is to say, the aneroid or other pressure transducer does not provide any force into the system.

The servomotor 52 also drives a mechanical feedback loop. This mechanical feedback loop is illustrated in FIG. 3, as described previously. This gearing mechanism is not further illustrated in FIG. 10. The rotary motion of the servomotor 52 is combined at a summing junction 201 with the output of a barometric correction network 237, to be explained. An error signal output from the summing junction 201 is a rotary motion applied to a rotary-to-rectilinear motion transducer 205 for producing rectilinear motion as a second input to the summing junction 209.

To reference the system of FIG. 10 to the previously described FIGURES, the summing junction 201 generally is illustrated by the gear 70 as coupled to the shaft 68 and the gear 160 as coupled to the housing of the transducer 66. The rotary-to-rectilinear motion transducer 205 corresponds to internal mechanism of the transducer 66 as coupled to an aneroid pressure transducer.

Functionally, the summing junction 201 combines an indicated altitude rotary motion signal from the servomotor 52 with a barometric correction pressure altitude rotary motion signal from the network 237. Thus, everything to the right of the summing junction 201 is indicated altitude, whereas to the left of the summing junction a mechanical signal becomes pressure or absolute altitude due to the combining with the barometric correction signal at the summing junction.

Up to this point, what has been described with reference to FIG. 10 is an inner feedback loop of an altimeter flight instrument. What is summed at the junction 209 is a rectilinear displacement generated by the pressure transducer and an equal rectilinear displacement generated by the feedback loop of the altimeter, the magnitude of which uniquely describes a particular pressure altitude. The servomotor 52 functions as an integrator and the inner loop comprises a servo system that operates with zero error signals until intentionally displaced.

Returning to the summing junction 201, the output thereof provides one output of the instrument and is an absolute pressure signal applied to a pressure altitude encoder 239. The altitude encoder 239 responds to the rotary mechanical motion from the summing junction 201 and also to an absolute pressure electrical signal on a line 241. The altitude encoder 239 is described in the copending application of James R. Younkin and John M. Nixon, filed Mar. 25, 1974, Ser. No. 454,306, now U.S. Pat. NO. 3,953,847.

Also coupled to the output shaft of the servomotor 52 is the potentiometer 72 that converts the indicated altitude rotary motion into an electrical signal applied to a summing junction 206. The gear train coupling the output of the servomotor 52 to the potentiometer 72 has been previously described with reference to FIG. 3. Thus, the output of the potentiometer 72 is an electrical signal of indicated altitude.

Also coupled to the summing junction 206 is an electrical signal from the network 237. With reference to FIG. 9, the electrical signal applied to the summing junction 206 is provided at the output of the potentiometer 208 as adjusted by the knob 31. An electrical barometric correction signal is provided in the system in addition to the mechanical barometric correction signal applied to the summing junction 201. Thus, the output of the summing junction 206 is an electrical signal varying with indicated altitude as corrected by barometric pressure. The output of the summing junction 206 is a pressure related signal or a signal related to pressure altitude. This pressure related electrical signal is applied over the line 241 to the encoder 239.

To provide an accurate altimeter three sources of possible error must be compensated for or corrected. These three possible sources of error include the aneroid transducer 203 that provides a nonlinear output, that is, the curve of displacement versus altitude generated by an aneroid is not linear with altitude. A second source is also in the aneroid in that such devices have a variation between units of total deflection, that is, there is no certainty that two different aneroids will respond to a given pressure to produce the same mechanical motion. A third source of error is the temperature sensitivity of an aneroid and the related mechanical structure.

To compensate for a particular aneroid sensitivity and the nonlinear response of aneroids, the electrical signal from the summing junction 206 is applied to an altitude error corrector 207 comprising a nonlinear network. The nonlinear network generates a nonlinear signal varying as a function of pressure altitude as represented by the output of the summing junction 206. By means of the nonlinear network of the corrector 207, an electrical signal can be shaped to the appropriate waveform to compensate for aneroid operation. This electrical signal from the corrector 207 is applied to a summing junction 228 having an output coupled to the rectilinear motion plus electrical converter 171.

As will be understood, a flight altimeter must function over a broad range of temperatures. It is inherent with mechanical structures to drift with temperature and the aneroid of the pressure transducer 203 will have a temperature characteristic that will cause the indicated altitude displayed to drift with temperature. A temperature corrector 235 is thus connected to the summing junction 228 to provide an electrical correction signal to the rectilinear motion plus electrical converter 171. The corrector 235 generates an electrical output signal as a function of temperature, but due to the characteristics of some aneroids this output can be a nonlinear function of temperature. It is a signal that will go through a null and be polarized in one direction as the temperature falls below a standard temperature set point. As the ambient temperature crosses below the standard set point the output of the corrector 235 will be polarized in one direction and have a magnitude controlled by adjustments of the corrector network. As the temperature increases above the standard set point, the output of the corrector 235 will be polarized in an opposite direction and have a magnitude selected to have gradients as a function of temperature.

The output of the corrector 235 is summed with the output of the corrector 207 to provide a composite correction signal to the converter 171. The correction signal derived from the summing junction 228 is temperature plus altitude correction. The temperature correction is a signal correcting the aneroid characteristics plus anything else within the system that would produce a temperature error in the indicated altitude signal. An important feature of the present invention is that an altimeter flight instrument is temperature and altitude corrected by an electrical subsystem.

Figures 11, 12:
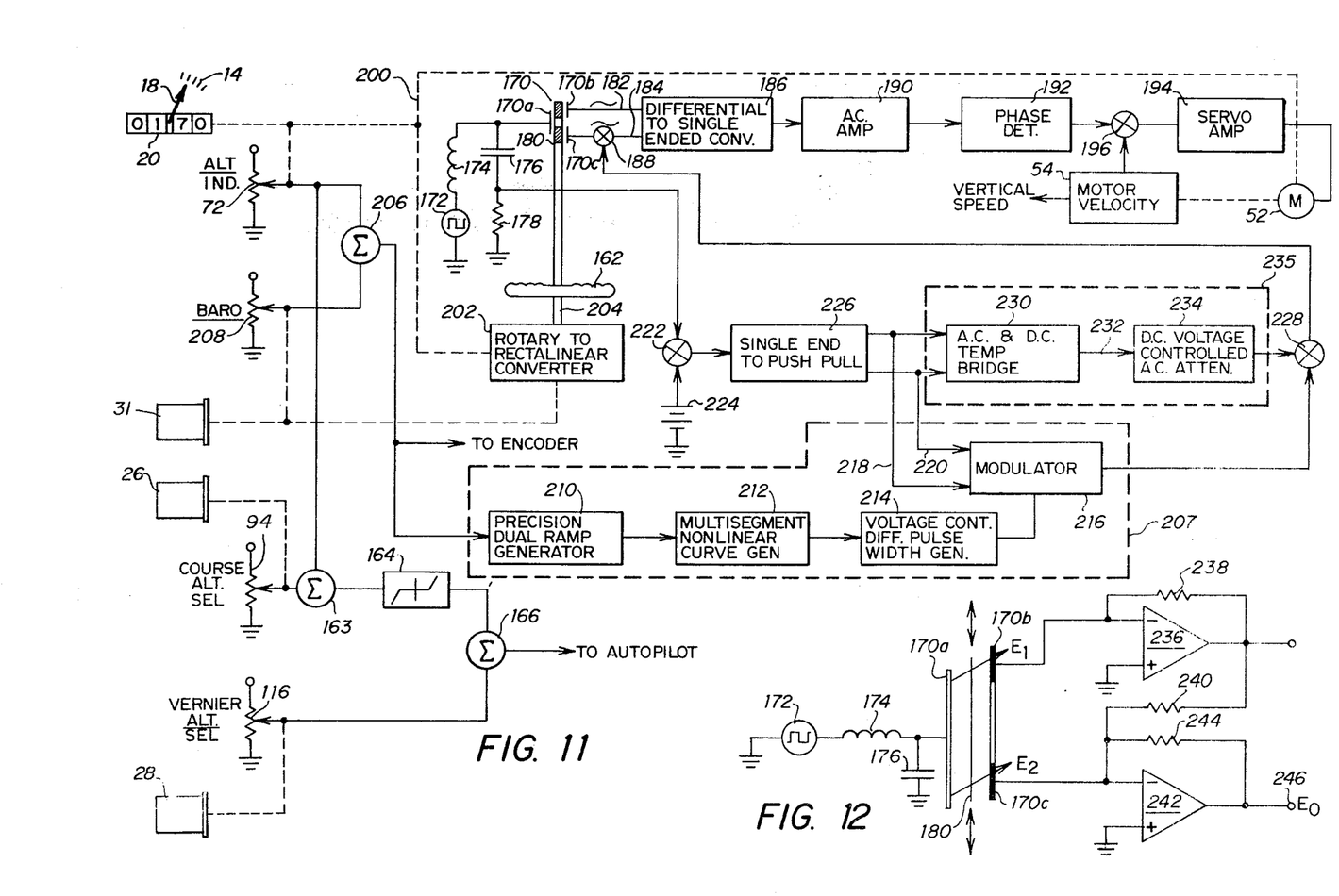
FIG. 11 is a schematic of a control system for electrically coupling the indicators and adjustments illustrated in FIGS. 1-9.
FIG. 12 is a schematic of the differential to single ended converter of FIG. 11 responsive to the difference in varying capacitance between two capacitor pick-offs.

Referring to FIG. 11, there is shown a block diagram of a system for responding to the output of the pressure transducer 66 and for electronically compensating an aneroid 162 of the pressure transducer 203. The aneroid 162 has a mechanical connection to a capacitance pick-off 170 as part of the transducer for converting the rectilinear motion of the aneroid 162 into an electrical signal. Basically, the capacitance pick-off 170 comprises two capacitors including a plate 170a and plates 170b and 170c. The plate 170a is connected across an LC network (inductor 174 and capacitor 176) that is driven by a voltage source 172 producing a square wave output, typically at 20,000 Hertz. Because the LC network is resonant at its excitation frequency, the plate 170a is excited by a high voltage sine wave. The capacitor 176 is coupled to ground through a current sampling resistor 178.

A change in pressure on the aneroid 162 displaces a vane 180 between the plates 170a, 170b and 170c to produce a differential voltage signal on lines 182 and 184 applied to inputs of a differential to single ended converter 186. An output of the converter 186 is a voltage varying with the difference between the signals on the lines 182 and 184. Note, that the line 184 is connected between a summing junction 188 and the input to a converter 186.

The output of a converter 186 is amplified in an AC amplified 190 and the signal is detected in a phase detector 192. An output voltage from the phase detector 192 varies with the position of the vane 180 and is thus related to the pressure change exerted on the aneroid 162. With reference to FIG. 10, the amplifier 190, the phase detector 192, the capacitor 170, the summing junction 188 and the converter 186 comprise the rectilinear motion plus electrical signal converter 171.

The output of the detector 192 is coupled to the input of a servo amplifier 194 through a summing junction 196. The servo amplifier 194 has an output that drives the servomotor 52 that is mechanically connected to a velocity generator 54. The output signal generated by the velocity generator 54 provides a feedback voltage to the summing junction 196 to complete the servo loop for the motor 52. A second output from the generator 54 is a vertical speed signal coupled into the autopilot of an aircraft.

Mechanically coupled to the output shaft of the motor 52 by means of linkage 200 is the digital altitude indicator 20 and the analog pointer 18 in addition to rotary-to-rectilinear converter 202 as part of the transducer 66 for positioning the aneroid 162 through a lead screw 204. Also mechanically coupled to the output shaft of the altitude servomotor 52 is the wiper arm of the potentiometer 72.

By means of the mechanical connection between the servomotor 52 and the converter 205, a displacement of the vane 180 by means of a pressure change on the aneroid 162 causes the converter 202 to reposition the aneroid 162 to return the vane to a null position. Aneroids, as discussed previously, provide a nonlinear displacement with altitude and must be compensated to provide energization of the servomotor 52 to give an accurate reading at the altitude indicator 20 and the analog pointer 18. This compensation is provided by means of an electronic compensation circuit.

The output of the converter 186 is a voltage that varies with indicated altitude to drive the motor 52 to reposition the aneroid 162. To compensate for the nonlinearity of the aneroid 162, a compensating voltage is generated that also varies with atmospheric pressure, temperature and altitude.

A voltage at the wiper arm of the potentiometer 72 varies with indicated altitude and this signal is coupled to the summing junction 206. A barometric set point varying voltage is generated at the wiper arm of the potentiometer 208 as part of the network 237 and is also coupled to the summing junction 206. The output of the summing junction 206 is thus a voltage varying proportionally with pressure altitude and this signal is coupled to the input of a dual ramp generator 210 as part of the corrector 207.

The dual ramp generator 210 utilizes the output of the summing junction 206 to drive two ramp generators. One of these ramp generators produces a voltage varying with altitude starting at -1000 feet and increasing to a limit, for example, 17,000 feet. The output of the second ramp generator is constrained below this limit altitude and the output thereof remains at a reference level. At the limit level, the first ramp generator saturates and the output of the second ramp generator increases with altitude starting at the cutoff of the first generator and increases to an upper limit of the system.

These two voltages are combined and coupled to a multisegment nonlinear curve generator 212 having a number of independent ramp generators varying with the number of segments desired to correct for nonlinearity of the aneroid 162. Typically, the output of the ramp generator 210 is coupled to four ramp generators in the curve generator 212. The first of these ramp generators produces a voltage increasing with altitude starting at -1000 feed and increasing to a first level. The second ramp generator produces a voltage output varying with altitude starting at the first cutoff and increasing to a second cutoff altitude. The third ramp generator produces an output voltage varying with altitude starting at the second cutoff level and increasing to a third cutoff level, and the fourth ramp generator produces an output voltage varying with altitude starting at the third cutoff level and increasing to the system's limits. For example, considering that the system upper limit is 35,000 feet MSL, then the first cutoff is set at 8,000 feet, the second cutoff is 7,000 feet and the third cutoff is 6,000 feet. These voltages are combined to produce an output voltage varying with altitude wherein the plot of voltage versus altitude represents a piecewise linear curve, the mirror image of the nonlinear output curve produced by the aneroid 162.

The output voltage from the curve generator 212 is coupled to a voltage control differential pulse width generator 214 producing a square wave output having an established period with the width of the positive and negative pulses of each period varying with the output voltage of the generator 212. These varying width output pulses from the generator 214 are coupled to a modulator 216 as the modulating wave for two input signals generated on lines 218 and 220.

Connected to the junction of the capacitor 176 and the resistor 178 is a summing junction 222 for combining a signal varying as the output of the source 172 with a DC voltage from a source 224. The combined voltage from the junction 222 is connected to an input of a single ended to differential converter 226 having one output varying in phase with the output of the source 172 and a second output having a 180° phase displacement from the first output. These two output voltages from the converter 226 appear on the lines 218 and 220 as inputs to the modulator 216. Thus, the modulator 216 has as two inputs one voltage that varies in phase with the output of the source 172 and a second input that varies 180° phase displaced therefrom. These voltages are modulated by the output of the generator 214 to produce a pulse width modulated signal as one input to a summing junction 228. This voltage constitutes an altitude correction signal for the aneroid 162 and has a phase relationship compatible with the voltage on line 182.

The output of a summing junction 228 is coupled to the summing junction 188, as part of the rectilinear motion plus electrical converter 171, to be added to the voltage at the capacitor plate 170c to produce a differential voltage on line 184 with respect to the voltage on line 182 as inputs to the converter 186. The injection of an AC signal of proper frequency and phase into junction 188 causes the mechanical center or null point of the capacitive pick-off to move in a controllable manner. Thus, the altitude correction signal from the modulator 216 modifies the output of the amplifier 186 to effect the energization of the servomotor 52 and thereby the repositioning of the vane 180 through the converter 202. The effect produced by summing the output of the modulator 216 with the voltage from the capacitor plate 170c is to correct for the nonlinearity of the aneroid 162.

In addition to altitude correction, that is, the nonlinear movement of the aneroid 162 with altitude, temperature correction is also necessary for accurate altitude indication. The differential output of the converter 226 is applied to a temperature bridge 230 (as part of the temperature corrector 235) that includes a temperature sensitive element for producing an output voltage on a line 232 that varies with temperature. This output voltage is coupled to a voltage controlled attenuator 234 having an output connected to the summing junction 228 to be combined with the correction voltage from the modulator 216. Thus, the output of the junction 228 as summed with the capacitor plate voltage varies both with altitude and temperature to provide correction of the aneroid 162.

There is also shown in FIG. 11 a basic control system for operation with the flight instrument of FIGS. 1–9. A selected altitude is chosen by positioning the knobs 26 and 28 which, respectively, positions the wiper arm with respect to the potentiometer winding of potentiometers 94 and 116. Although not shown, it will be understood that each of the windings for the potentiometers 72, 94 and 116 are coupled to suitable sources of energizing voltages. A voltage at the wiper arm of the potentiometer 72 and at the wiper arm of the potentiometer 94 are summed at a junction 163 with the summed results connected to one input of a function generator 164. The output of the function generator 164 and the voltage at the wiper arm of the potentiometer 116 are summed at the junction 166 with the resulting signal available as an autopilot input signal and/or the input signal for an altitude alerting system. This interconnection of potentiometers 72, 94 and 116 establishes a selected altitude signal and a deviation therefrom.

Referring to FIG. 12, there is shown schematically a circuit for responding to the difference in capacitance between pairs of the individual plates 170b and 170c to produce a single ended voltage signal. The oscillator 172 provides an alternating current signal to the plate 170a. As mentioned, the plate 170a forms one element of an array of variable capacitors with individual plates 170b and 170c forming the second element of two differentially variable capacitors each coupled to the oscillator 172. The value of the capacitances varies with the position of the vane 180 extending between the plates.

The plate 170b is connected to the inverting input terminal of a differential amplifier 236 having a noninverting input terminal tied to ground. At the output terminal of the amplifier 236 there is connected a feedback resistor 238 also connected to the inverting input terminal. In addition, a resistor 240 is connected between the output terminal of the amplifier 236 and the inverting input terminal of an amplifier 242. The inverting input terminal of the differential amplifier 242 is also connected to the plate 170c as part of the capacitor array as illustrated in FIG. 11. The noninverting input terminal of the amplifier 242 is tied to ground. At the output terminal of the amplifier 242 there is connected a feedback resistor 244 also tied to the inverting input terminal.

If the voltage at the plate 170b is identified as $E_1$, then the output of the amplifier 236 is equal to $KE_1$ and this voltage is summed with the voltage $E_2$ at the plate 170c at the inverting input terminal of the amplifier 242. This produces an output voltabe $E_o$ at the terminal 246 that varies in accordance with the expression $E_o = KE_2 - KE_1$, where $K_1$ and $K_2$ are gain factors determined by the value of the feedback resistors. Thus, the capacitance differential between the plates 170b and 170c generates a single ended voltage at the terminal 246 connected to the amplifier 190.

While only one embodiment of the invention, together with modifications thereof, has been described in detail herein and shown in the accompanying drawings, it will be evident that various further modifications are possible without departing from the scope of the invention

What is claimed is:

1. A flight instrument as part of an altitude indicator system having a pressure transducer generating a signal varying with aircraft altitude and including an atmospheric pressure set point adjustment, comprising in combination:
    altitude indicator means having digital display means and analog display means each responsive to the signal varying with aircraft altitude,
    altitude selector means for generating a signal to an altitude control system to establish a desired aircraft altitude, said altitude selector means including a first adjustment means and a second adjustment means, the first adjustment means varying the altitude selection over the most significant increments thereof and the second adjustment means varying the altitude selection over the least significant increments, and
    a digital indicator including means coupled to said altitude selector means for digitally indicating a set point of the desired aircraft altitude.

2. A flight instrument for an aircraft as set forth in claim 1 wherein said first adjustment means includes positive positioning means.

3. A flight instrument for an aircraft as set forth in claim 1 including means for adjusting the atmospheric pressure set point and a set point indicator coupled thereto to present a visual display of a selected atmospheric pressure.

4. A flight instrument for an aircraft as set forth in claim 1 wherein said altitude indicator includes an analog rotating pointer display and a rotary drum digital indicator displaying a digital readout of aircraft altitude.

5. A flight instrument for an aircraft as part of an altitude indicator system, comprising in combination:
    pressure transducer means generating a signal varying with aircraft altitude and including an atmospheric pressure set point adjustment,
    altitude indicator means having digital display means and analog display means each responsive to the signal varying with aircraft altitude,
    altitude selector means including a first adjustment means and a second adjustment means for generating a signal to an altitude control system to establish a desired aircraft altitude, the second adjustment means varying the altitude selection over the least significant increments thereof and the first adjustment means including a positive positioning means, and
    means for adjusting the atmospheric pressure set point of said pressure transducer means.

6. A flight instrument for an aircraft as set forth in claim 5 wherein said altitude indicator includes an analog rotating pointer display and a rotary drum digital indicator displaying a digital readout of aircraft altitude.

7. A flight instrument for an aircraft as part of an altitude indicator system, comprising in combination:
    pressure transducer means generating a signal varying with aircraft altitude and including an atmospheric pressure set point adjustment,
    altitude indicator means having digital display means and analog display means each responsive to the signal varying with aircraft altitude,
    altitude selector means for generating a signal to an altitude control system to establish a desired aircraft altitude, said altitude selector means including a first adjustment means and a second adjustment means, the first adjustment means varying the altitude selection over the most significant increments thereof and the second adjustment means varying the altitude selection over the least significant increments, and
    means for adjusting the atmospheric pressure set point of said pressure transducer means.

8. A flight instrument for an aircraft as set forth in claim 7 including a set point indicator coupled to the means for adjusting the atmospheric pressure set point to present a visual display of a selected altitude pressure.

9. A flight instrument for an aircraft as set forth in claim 7 wherein said first adjustment means includes positive positioning means.

10. A flight instrument for an aircraft as set forth in claim 7 wherein said altitude indicator includes an analog rotating pointer display and a rotary drum digital indicator displaying a digital readout of aircraft altitude.

11. A flight instrument for an aircraft as part of an altitude indicator, comprising in combination:
    pressure transducer means generating a signal varying with aircraft altitude and including an atmospheric pressure set point adjustment,
    altitude indicator means having digital display means and analog display means each responsive to the signal varying with aircraft altitude,
    altitude selector means for generating a signal to an altitude control system to establish a desired aircraft altitude, said altitude selector means including a first adjustment means for varying the altitude selection over the most significant increments thereof and a second adjustment means for varying the altitude selection over the least significant increments,
    a digital indicator including means coupled to said altitude selector means for digitally indicating a set point for the desired aircraft altitude, and
    means for adjusting the atmospheric pressure set point of said pressure transducer means.

12. A flight instrument for an aircraft as set forth in claim 11 including set point indicator means coupled to the means for adjusting the atmospheric pressure set point to present a display of a selected altitude pressure.

13. A flight instrument for an aircraft as set forth in claim 11 wherein said first adjustment means includes positive positioning means.

14. A flight instrument for an aircraft as set forth in claim 11 wherein said altitude indicator means includes an analog dial pointer display and a rotary drum digital indicator displaying a digital readout of aircraft altitude.

* * * * *